United States Patent
Dries et al.

(10) Patent No.: US 12,038,514 B2
(45) Date of Patent: Jul. 16, 2024

(54) METHODS FOR DETECTING REPLAY ATTACKS IN GNSS SYSTEMS AND METHODS THEREOF

(71) Applicant: Orolia USA Inc., W. Henrietta, NY (US)

(72) Inventors: Ronald Franklin Dries, Rochester, NY (US); Michael Pratt, Fairport, NY (US); Ryan Johnson, Pittsford, NY (US)

(73) Assignee: OROLIA USA INC., W. Henrietta, NY (US)

( * ) Notice: Subject to any disclaimer, the term of this patent is extended or adjusted under 35 U.S.C. 154(b) by 847 days.

(21) Appl. No.: 17/062,073

(22) Filed: Oct. 2, 2020

(65) Prior Publication Data
US 2021/0103058 A1 Apr. 8, 2021

Related U.S. Application Data

(60) Provisional application No. 62/910,778, filed on Oct. 4, 2019.

(51) Int. Cl.
| | |
|---|---|
| *G01S 19/21* | (2010.01) |
| *G01S 19/22* | (2010.01) |
| *G06N 3/08* | (2023.01) |
| *G06N 20/00* | (2019.01) |
| *H04L 41/06* | (2022.01) |

(52) U.S. Cl.
CPC ............ *G01S 19/215* (2013.01); *G01S 19/22* (2013.01); *G06N 3/08* (2013.01); *G06N 20/00* (2019.01); *H04L 41/06* (2013.01)

(58) Field of Classification Search
CPC ......... G01S 19/215; G01S 19/22; G06N 3/08; G06N 20/00; H04L 41/06; H04W 12/122
See application file for complete search history.

(56) References Cited

U.S. PATENT DOCUMENTS

| | | | |
|---|---|---|---|
| 11,531,117 B1* | 12/2022 | Brashar | G01S 19/215 |
| 2005/0147196 A1 | 7/2005 | Quilter et al. | |
| 2007/0247958 A1* | 10/2007 | Lee | G11C 7/22 365/230.06 |
| 2010/0117899 A1 | 5/2010 | Papadimitratos et al. | |
| 2011/0207489 A1 | 8/2011 | DeLuca | |
| 2016/0341830 A1* | 11/2016 | Dougan | G01S 19/215 |

(Continued)

OTHER PUBLICATIONS

P. Papadimitratos et al., GNSS-based Positioning: Attacks and Countermeasures, MILCOM 2008—2008 IEEE Military Communications Conference, 7 pages (Year: 2008).*

(Continued)

*Primary Examiner* — Bernarr E Gregory
*Assistant Examiner* — Fred H Mull
(74) *Attorney, Agent, or Firm* — Troutman Pepper Hamilton Sanders LLP (Rochester)

(57) ABSTRACT

A method, non-transitory computer readable medium, device, and system that detects a replay attack includes monitoring Global Navigation Satellite System (GNSS) time obtained by a GNSS receiver from a GNSS signal from a GNSS satellite. An alert condition for the replay attack is identified based on at least a detected delay between a universal coordinated time (UTC) and the GNSS time. An alert notification is provided based on the identification of the alert condition for the replay attack.

32 Claims, 4 Drawing Sheets

(56) References Cited

U.S. PATENT DOCUMENTS

| | | | |
|---|---|---|---|
| 2016/0370471 A1 | 12/2016 | Mabuchi et al. | |
| 2017/0060101 A1* | 3/2017 | Abbott | H04K 3/90 |
| 2017/0350985 A1 | 12/2017 | Agee | |
| 2018/0335523 A1* | 11/2018 | Namineni | G01S 19/215 |
| 2019/0187294 A1 | 6/2019 | Khalajmehrabadi et al. | |
| 2021/0109229 A1* | 4/2021 | Söderholm | G01S 19/215 |

OTHER PUBLICATIONS

P. Papadimitratos et al., Protection and Fundamental Vulnerability of GNSS, 2008 IEEE International Workshop on Satellite and Space Communications, p. 167-171 (Year: 2008).*

K. Zhang, Protecting GNSS-based Services using Time Offset Validation, 2020 IEEE/ION Position, Location and Navigation Symposium (PLANS), p. 575-583, Apr. 2020 (Year: 2020).*

International Preliminary Report on Patentability, dated Apr. 5, 2022.

International Search Report and Written Opinion for corresponding PCT/US 20/54053, mailed Jan. 26, 2021. pp. 1-18.

EP Patent Application No. 20871040.0, Extended European Search Report, dated Oct. 6, 2023.

* cited by examiner

METHODS FOR DETECTING REPLAY ATTACKS IN GNSS SYSTEMS AND METHODS THEREOF

This application claims the benefit of U.S. Provisional Patent Application Ser. No. 62/910,778, filed Oct. 4, 2019, which is hereby incorporated by reference in its entirety.

FIELD

This technology relates to methods for detecting replay attacks in GNSS systems and devices thereof.

BACKGROUND

An example of a typical replay attack will be illustrated and described with reference to FIG. 1. In this example, the user equipment computing device 10(1), which detects replay attacks in GNSS systems in accordance with examples of the claimed technology illustrated and described below, is attempting to receive one of the valid signals (V1-Vn) from the Global Navigation Satellite System (GNSS) satellites 12(1)-12(n). However, in this example the attacker equipment computing device 14 is attempting to fool or spoof the user equipment computing device 10(1) into receiving a fake signal F1 from the attacker equipment computing device 14.

To attempt to fool or spoof the user equipment device 12, the attacker equipment computing device 14 receives one of the valid GNSS signals (V1-Vn) from one of the GNSS satellites 12(1)-12(n) and then either re-transmits it immediately or records it to be played back at a later time. The fake signal F1 from the attacker equipment computing device 14 will differ from a valid signal in two ways: (1) the fake signal will represent the position of the receive antenna for the attacker equipment computing device 14, not the receive antenna for the user equipment computing device 10(1); and (2) the fake signal will be delayed in time. Unfortunately, in this replay attack situation, it is very difficult to determine whether a position report is fake because valid signals are used in the transmission of the fake signal.

SUMMARY

A method for countering and detecting a replay attack includes monitoring, by a computing device, a Global Navigation Satellite System (GNSS) time obtained by a GNSS receiver from a GNSS signal from a GNSS satellite. An alert condition for the replay attack is identified, by the computing device, based on at least a detected delay between a universal coordinated time (UTC) and the GNSS time. An alert notification is provided, by the computing device, based on the identification of the alert condition for the replay attack.

A non-transitory machine-readable medium having stored thereon instructions comprising executable code which when executed by one or more processors, causes the processors to monitor a Global Navigation Satellite System (GNSS) time obtained by a GNSS receiver from a GNSS signal from a GNSS satellite. An alert condition for the replay attack is identified based on at least a detected delay between a universal coordinated time (UTC) and the GNSS time. An alert notification is provided based on the identification of the alert condition for the replay attack.

A computing device includes a memory comprising programmed instructions stored thereon and one or more processors configured to be capable of executing the stored programmed instructions to monitor a Global Navigation Satellite System (GNSS) time obtained by a GNSS receiver from a GNSS signal from a GNSS satellite. An alert condition for the replay attack is identified based on at least a detected delay between a universal coordinated time (UTC) and the GNSS time. An alert notification is provided based on the identification of the alert condition for the replay attack.

A system comprising one or more server devices executing in a cloud environment or one or more computing devices, each of the devices having memory comprising programmed instructions stored thereon and one or more processors configured to execute one or more of the stored programmed instructions to monitor a Global Navigation Satellite System (GNSS) time obtained by a GNSS receiver from a GNSS signal from a GNSS satellite. An alert condition for the replay attack is identified based on at least a detected delay between a universal coordinated time (UTC) and the GNSS time. An alert notification is provided based on the identification of the alert condition for the replay attack The technology provides a number of advantages including providing methods and devices that effectively detect replay attacks in GNSS systems. With examples of this technology, GNSS replay attacks can be effectively countered by detecting time changes and delays between a valid GNSS signal and a fake signal so that an alarm or other alert on the attack can be provided. Examples of this technology may also eliminate false positives by identifying detected delays related to a multipath condition. Examples of this technology also may utilize neural network detector or other artificial intelligence to identify delays between a UTC and a GNSS time to effectively detect a replay attack and to efficiently identify any multipath condition. Additionally, examples of this technology which utilize a directional antenna may generate and provide an estimated location of attacking computing equipment. Further, examples of this technology may execute various aspects of this technology in a cloud computing environment which can be communicated to user equipment devices.

DETAILED DESCRIPTION

Figure 1:
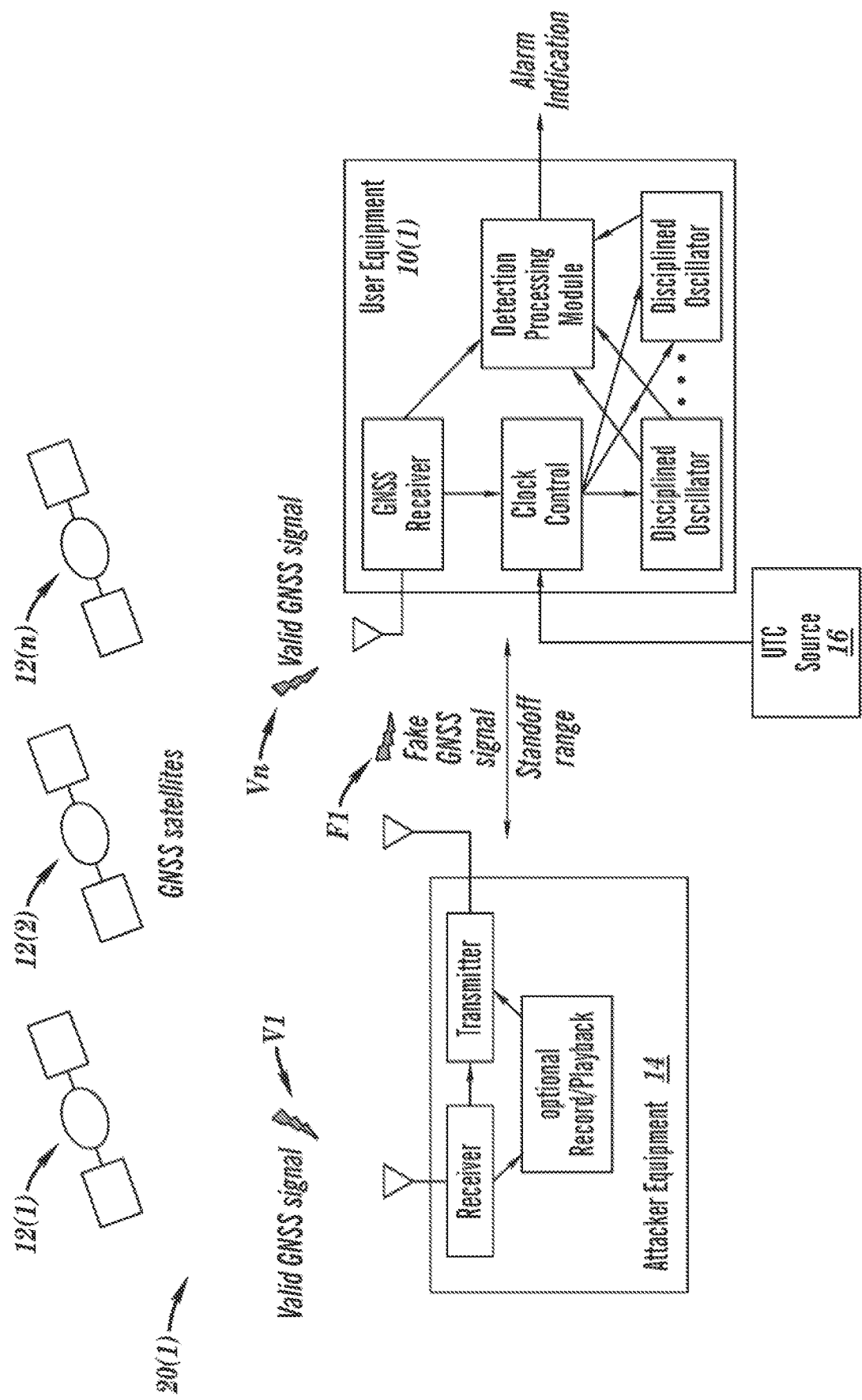
FIG. 1 is a block diagram of an exemplary environment with a user equipment computing device, a Global Navigation Satellite System (GNSS) satellites, and an attacker equipment computing device.

An environment 20(1) with an example of a user equipment computing device 10(1) that detects replay attacks in GNSS systems is illustrated in FIG. 1. In this example, the environment includes the user equipment computing device 10(1), GNSS satellite transmitters 12(1)-12(n), the attacker equipment computing device 14, and an optional UTC source 16, although other types and/or numbers of other systems, devices, components, and/or other elements in other configurations may be used. This technology provides a number of advantages including providing methods and devices that counter GNSS replay attacks by detecting time changes and delays between a valid GNSS signal and a fake signal so that an alarm or other alert about the attack can be provided.

Figure 2:
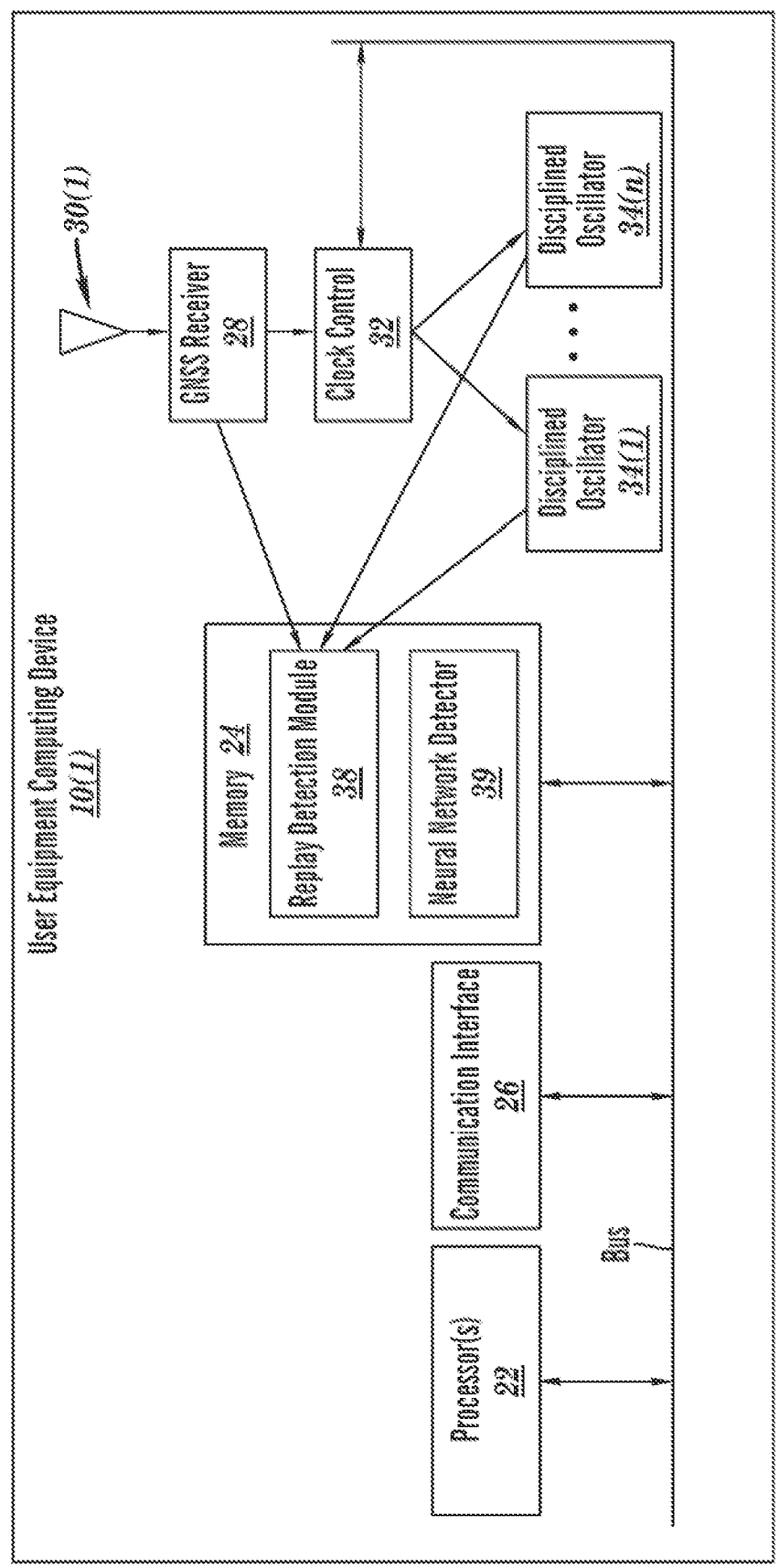
FIG. 2 is a block diagram of the example of the user computing device shown in FIG. 1.

Referring more specifically to FIG. 2, the user equipment computing device 10(1) in this example includes at least one processor 22, a memory 24, a communication interface 26, a GNSS receiver 28 which includes an antenna 30(1), a clock control device 32, and one or more GNSS disciplined oscillators 34(1)-34(n) which are coupled together by a bus or other communication link 36, although the user equipment computing device 10(1) can include other types and/or numbers of elements in other configurations.

The processor 22 of the user equipment computing device 10(1) may execute programmed instructions stored in the memory for the any number of the functions or other operations illustrated and described by way of the examples herein. The processor 22 of the user equipment computing device 10(1) may include one or more CPUs or other processors with one or more processing cores, for example, although other types of processor(s) can also be used.

The memory 24 of the user equipment computing device 10(1) stores these programmed instructions for one or more aspects of the present technology as illustrated and described herein, although some or all of the programmed instructions could be stored elsewhere. By way of example, one or more aspects of the technology may be executed in a cloud computing environment 40 by one or more cloud computing servers 42(1)-42(n) as illustrated and described with reference to FIG. 4 herein. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor(s) 22, can be used for the memory 24.

Accordingly, the memory 24 of the user equipment computing device 10(1) can store application(s) that can include executable instructions that, when executed by the user equipment computing device 10(1), cause the user equipment computing device 10(1) to perform actions, such as to transmit, receive, or otherwise process signals related to navigation or other positioning, to detect and counter GNSS replay attacks, and to perform other actions illustrated and described by way of the examples herein with reference to FIGS. 1-4. The application(s) can be implemented as modules or components of other application(s). Further, the application(s) can be implemented as operating system extensions, modules, plugins, or the like. In this particular example, the memory 24 includes a replay detection module 38 that includes programmed instructions to detect and counter GNSS replay attacks as illustrated and described by way of the examples herein. Additionally, in this particular example, the memory 24 also includes a neural network detector 39 which has been trained with machine learning to detect delays in GNSS signals (V1-Vn) which indicate a replay attack and to identify a multipath condition as illustrated and described by way of the examples herein, although the neural network detector can be trained with machine learning to identify other aspects to assist with the accurate detection of a replay attack.

The communication interface 26 of the user equipment computing device 10(1) operatively couples and communicates between the user equipment computing device 10(1) and one or more GNSS satellite transmitters 12(1)-12(n) which are all coupled together by one or more communication network(s), although other types and/or numbers of connections and/or configurations to other devices and/or elements can be used. By way of example only, the communication network(s) can include local area network(s) (LAN(s)) or wide area network(s) (WAN(s)), and/or wireless networks by way of example only, although other types and/or numbers of protocols and/or communication networks can be used.

Figure 4:
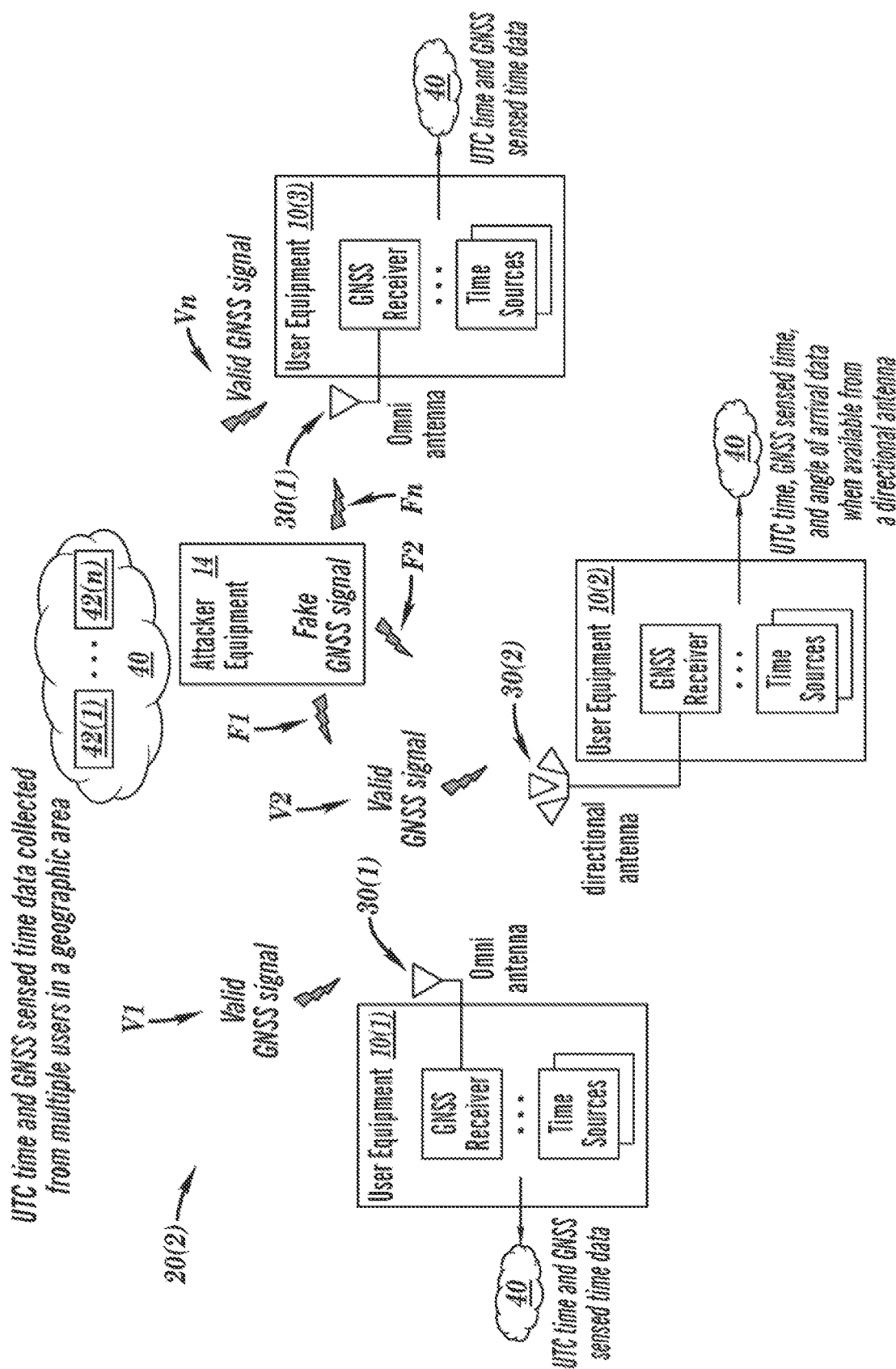
FIG. 4 is a block diagram of another exemplary environment with multiple user equipment computing devices, a cloud computing environment, and an attacker equipment computing device.

The GNSS receiver 28 with the antenna 30(1), the control clock device 32 and the one or more GNSS disciplined oscillators 34(1)-34(n) of the user equipment computing device 10(1) are coupled together and are configured to operate as a GNSS receiver timing system, although the user equipment computing device 10(1) may have other receiver timing devices or may be otherwise coupled or connected to one or more external receiver timing devices. The GNSS receiver 28 is configured to capture signals, such as data packets, from GNSS satellites 12(1)-12(n) when navigation or other positioning is to be determined, although other types of receivers may be used. In this example, each of the one or more GNSS disciplined oscillators 34(1)-34(n) is an oscillator whose output is controlled to agree with the signals broadcast by GNSS satellites 12(1)-12(n), although other types of controlled or disciplined oscillators or other timing elements with similar accuracy may be used. Additionally, in this example the antenna 30(1) is an omni-directional antenna, although other types of antennas may be used, such as a directional antenna 30(2) for user equipment device 10(2) as illustrated in FIG. 4. In this example, the control clock device 32 is configured to manage the operations of the one or more disciplined oscillators 34(1)-34(n) and maintains the UTC time from the UTC source 16, although the control clock device 32 may have other types and/or numbers of other functions. Further, in this example, each of the one or more GNSS disciplined oscillators 34(1)-34(n) is an oscillator with at least about $10^{-6}$ stability to provide in these examples the necessary accuracy for the calculated measurements, although other stability ranges may be used. By way of example only, each of the one or more GNSS disciplined oscillators 34(1)-34(n) may be a TCXO—Temperature Compensated quartz crystal Oscillator with at least about $10^{-6}$ stability, an OCXO—Oven Controlled quartz crystal Oscillator with about a $10^{-8}$-$10^{-10}$ stability, or an Atomic Oscillator with about a $10^{-11}$-$10^{-12}$ stability.

In this example, GNSS satellite transmitters 12(1)-12(n) are illustrated, although other types and/or numbers of satellite transmitters may be used. The GNSS satellites 12(1)-12(n) are configured to broadcast GNSS signals (V1-Vn) which can be received and processed by the user equipment computing device 10(1) for positioning and navigation.

The attacker equipment computing device 14 in this example includes at least one processor, a memory, a communication interface, a GNSS receiver which includes an antenna, which are coupled together by a bus or other communication link, although the attacker equipment computing device 14 can include other types and/or numbers of elements in other configurations. The attacker equipment computing device 14 may receive signal and may generate one of the fake signals (F1-Fn) which is transmitted to user equipment device 10(1) in the exemplary environment shown in FIG. 1 and user equipment computing devices 10(2)-10(3) in the exemplary environment shown in FIG. 4.

The UTC source 16 may provide a UTC time to the user equipment computing device 10(1) which can then be maintained by the clock control device 32 and the one or more disciplined oscillators 34(1)-34(n) in the user equipment computing device 10(1).

Referring to FIG. 4, another exemplary environment 20(2) with multiple user equipment computing devices 10(1)-10(3), a cloud computing environment 40 with cloud computing server devices 42(1)-42(n), and an attacker equipment computing device 14 is illustrated. The user equipment computing devices 10(2) and 10(3) are the same in structure and operation as the user equipment computing device 10(1), except as otherwise illustrated and described by way of the examples herein. As noted earlier, in this example user equipment computing devices 30(1) and 30(3) have an omni-directional antenna 30(1) while user equipment computing device 10(2) has a directional antenna 30(2) which can be used to identify an estimated location of the attacker equipment computing device 14. Further, in this example one or more aspects of the claimed technology, such as the replay detection module 38 and/or the neural network detector 39, may in part or all be executed by one or more of the cloud computing server devices 42(1)-42(n) in the cloud computing environment 40. For ease of illustration, the cloud computing environment 40 coupled to the user equipment computing devices 10(1)-10(3) is illustrated in multiple clouds in FIG. 4. Each of the cloud computing server devices 42(1)-42(n) may include at least one processor, a memory, and a communication interface which are coupled together by a bus or other communication link, although each of the cloud computing server devices 42(1)-42(n) can include other types and/or numbers of elements in other configurations Although the user equipment computing devices 10(1)-10(3), the GNSS satellite transmitters 12(1)-12(n), attacker equipment computing device 14, optional UTC source 16, and optional cloud computing environment 40 with cloud computing server devices 42(1)-42(n) are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that, when executed by the processor of the user equipment computing device 10(1), cause the processor to carry out steps necessary to implement the methods of the examples of this technology that are illustrated and described herein.

Figure 3:
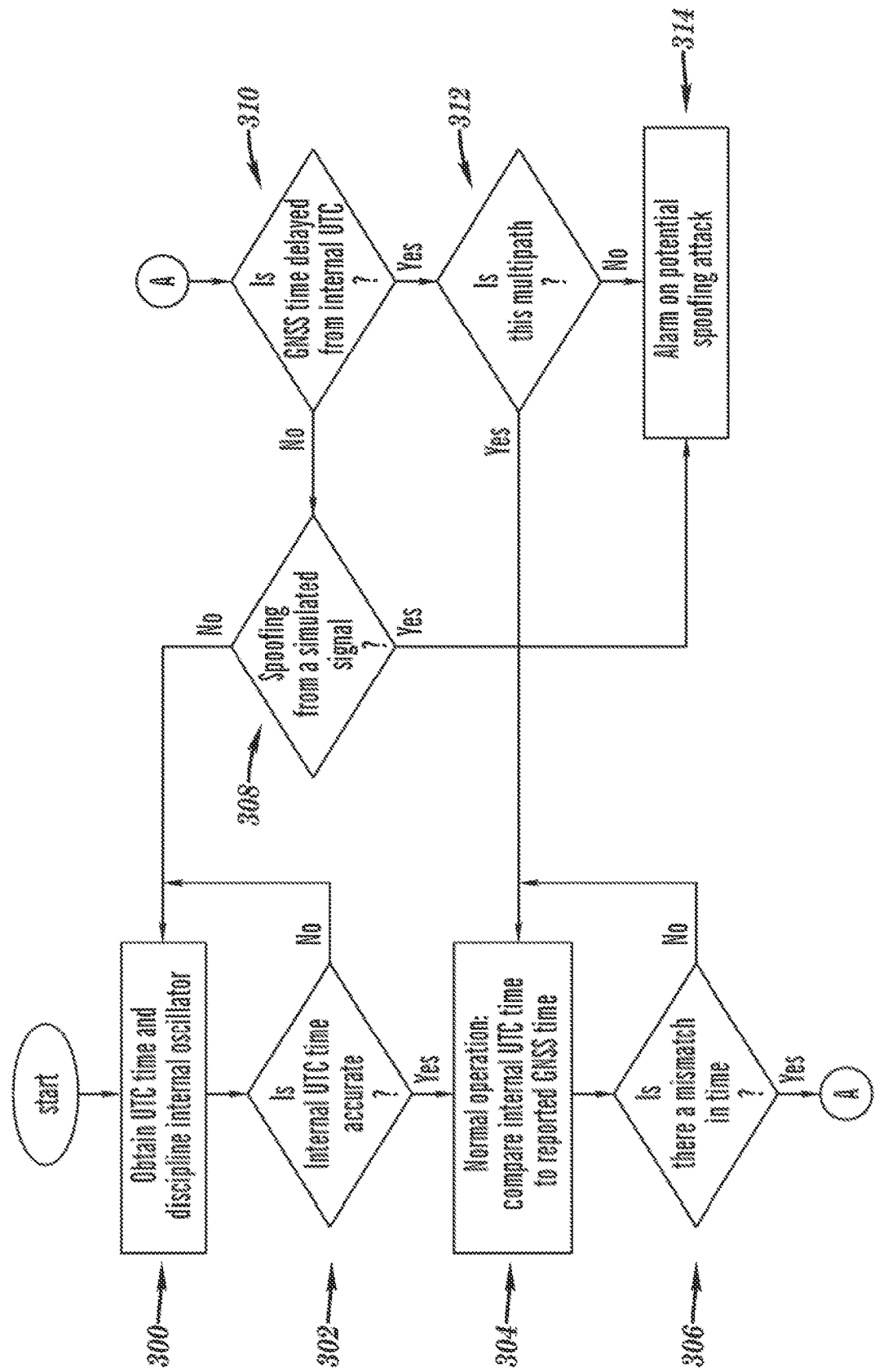
FIG. 3 is a flowchart of an example of a method for detecting replay attacks in GNSS systems.

Exemplary methods for detecting and countering GNSS replay will now be described with reference to FIGS. 1-4. Referring more specifically to FIG. 3, in these examples in step 300 the user equipment computing devices 10(1)-10(3) begin the initialization by obtaining a UTC time from one of the GNSS signals (V1-Vn) received by the GNSS receiver 28 with the antenna 30(1) or 30(2) from one of the GNSS satellites 12(1)-12(n) from a safe zone of no known attacks, or other detection methods for jamming and spoofing by way of example, although the UTC time can be UTC can be obtained in other manners, such as from another UTC source 16 by way of example only.

In the example shown in FIGS. 1-3, the control clock device 32 and one of the disciplined oscillators 34(1)-34(n) in the user equipment computing device 10(1) may be used to maintain an internal representation of the obtained UTC time. In this example, the user equipment computing device 10(1) may determine if the internal UTC time is accurate by comparing it to the obtained UTC time from the UTC source 16 in this example. This determination may include statistical averaging over time and spoofing detection on the obtained UTC time by way of example, although other types of determinations can be made. The same approach may be used with the user equipment computing devices 10(1)-10(3) shown in the example in FIG. 4.

In examples of this technology, one or more of the user equipment computing devices 10(1)-10(3) may use multiple disciplined oscillators 34(1)-34(n) to maintain an internal representation of the obtained UTC time, although other numbers may be used. Additionally, in other examples of this technology, each of the disciplined oscillators 34(1)-34(n) may have been disciplined from an obtained GNSS signal from one of the satellite transmitters 12(1)-12(n) individually and at separate times from each other. In this example, while one of the oscillators 34(1)-34(n) is being disciplined, the other ones of the oscillators 34(1)-34(n) are not. This protects the other ones of the oscillators 34(1)-34(n) from being corrupted by a fake one of the GNSS signals (V1-Vn) in the disciplining process. As a result, at most, only one of the oscillators 34(1)-34(n) is corrupted.

Accordingly, in the example shown in FIGS. 1-3, the user equipment computing device 10(1) when obtaining a UTC from two or more of the disciplined oscillators 34(1)-34(n) to try counter and detect a replay attack, may employ a majority voting scheme to determine the correct UTC time to use to compare against the received one of the GNSS signals (V1-Vn) which needs to be checked for a possible replay attack. For example, the majority voting scheme being executed may use two of the disciplined oscillators 34(1)-34(n) and the external UTC source 16 or may use three disciplined oscillators 34(1)-34(n) or some other number of disciplined oscillators to identify the reliable UTC. Further, in this example, the user equipment computing device 10(1) may identify the one of the oscillators 34(1)-34(n) which is not in conformance with the others and therefore assumed to be corrupted and may take that one of the oscillators 34(1)-34(n) offline or otherwise ignore it until it can be reset.

As illustrated in these examples, the UTC time can be obtained from different sources and when multiple sources are used a majority or other voting scheme can be used to obtain an accurate UTC. The same approach can be used with the user equipment computing devices 10(1)-10(3) shown in the example in FIG. 4.

Referring back to FIGS. 1-3, in step 302 the user equipment computing device 10(1) determines if the internal UTC time is accurate by comparing it to the obtained UTC time from the UTC source 16 in this example. This determination may include statistical averaging over time and spoofing detection on the obtained UTC time by way of example, although other types of determinations can be made. The same approach can be used with the user equipment computing devices 10(1)-10(3) in the example shown in FIG. 4.

If in step 302 the user equipment computing device 10(1) determines the internal UTC time is not accurate, then the No branch may be taken back to step 300 to obtain another UTC time as described above and possibly from another source. If in step 302 the user equipment computing device 10(1) determines the internal UTC time accurately matches the obtained UTC time then the Yes branch is be taken to step 304.

In step 304, once the user equipment computing device 10(1) has achieved an accurate UTC time synchronization internally with the control clock device 32 and the disciplined oscillators 34(1)-34(n), then the user equipment computing device 10(1) enters a normal operation state in this state. In the normal operation state, the user equipment computing device 10(1) compares the internal UTC synchronized time to a GNSS time obtained from one or more valid GNSS signals V1-Vn from one or more of the GNSS satellites 12(1)-12(n) received by the GNSS receiver 28 with the antenna 30(1). As noted earlier, in examples of this technology the user equipment computing device 10(1) when obtaining a UTC to try counter and detect a replay attack, may employ a majority voting scheme to determine the correct UTC time to use to compare against the received one of the GNSS signals (V1-Vn) which needs to be checked for a possible replay attack. The same approach can be used with the user equipment computing devices 10(1)-10(3) in the example shown in FIG. 4.

In step 306, the user equipment computing device 10(1) may determine if there is any discrepancy, i.e. a delay between the GNSS time and the internal UTC synchronized time. Accordingly, if in step 306, the user equipment computing device 10(1) determines there is no discrepancy, then the No can be taken back to step 304 to continue with normal operations. If in step 306, the user equipment computing device 10(1) determines there is a discrepancy which indicates the possibility of a replay attack, then the Yes branch is taken to step 310.

In step 310, the user equipment computing device 10(1) determines if the GNSS time is delayed from the internal UTC synchronized time. In this example, the user equipment computing device 10(1) may determine when the detected delay between the UTC and the GNSS time is above a set threshold and identify the alert condition indicting a replay attack when the determination indicates the detected delay is above the set threshold, although other manners for detecting the alert condition may be used. The same approach can be used with the user equipment computing devices 10(1)-10(3) in the example shown in FIG. 4. Additionally, in the example shown in FIG. 4, one or more of the cloud computing server devices 42(1)-42(n) in the cloud computing environment 40 may communicate with the user equipment computing devices 10(1)-10(3) and may make this determination. Further, one or more of the user equipment computing devices 10(1)-10(3) and/or one or more of the cloud computing server devices 42(1)-42(n) in the cloud computing environment 40 may train a neural network 39 on a subset of data with detected delays corresponding to replay attacks and another subset of data with detected delays not corresponding to replay attacks to dynamically adjust thresholds and/or to more accurately detect replay attacks.

In other examples of this technology, the user equipment computing device 10(1) may be configured to dynamically adjust the threshold based on an analysis of data of any identified alert conditions received by, for example, one or more other computing devices 10(2) and 10(3) located within a set geographic region, i.e. a set or defined region around the user equipment computing device 10(1) at the same time or within some set or otherwise stored time period. In other examples of the technology, one or more of the cloud computing servers 42(1)-42(n) in the cloud computing environment 40 may be used to monitor data from each of the user equipment computing devices 10(1)-10(3) related to detected replay attacks and may accordingly raise or lower the threshold. For example, if one of the user equipment computing devices 10(1)-10(3) within the same set geographic area and time period detects a replay attack then the threshold for detecting a replay attack for the other ones of the user computing devices 10(1)-10(3) may be lowered for a period of time and/or another alert or action may be implemented The discrepancy or time delay of a replay attack signal being detected by one or more of the user equipment computing devices 10(1)-10(3) in the examples herein will depend on several factors, such as: (1) the length of cabling between the receive antenna, receiver, transmitter, and transmitting antenna in the attacker equipment computing device 14; (2) electronics delay of the receiver and transmitter in the attacker equipment computing device 14; (3) any optional delay inserted by recording and then playing back by the attacker equipment computing device 14; and (4) a standoff range between the attacker equipment computing device 14 and the user equipment computing device 10(1).

If in step 310, the user equipment computing device 10(1) determines the GNSS time is not delayed from the internal UTC synchronized time, then the No branch is taken to step 308. In step 308, the user equipment computing device 10(1) determines if there is spoofing from a simulated signal. If we have arrived at this point, then the GNSS time precedes the internal UTC synchronized time. This is an indication to the user equipment computing device 10(1) that either there is a simulated signal attack occurring, i.e. spoofing and not a replay attack, although other manners for detecting spoofing from a simulated signal may be used, or that the internal UTC disciplined oscillator is in error, i.e., no longer in sync with the true UTC synchronized time. In other examples of this technology, one or more of the user equipment computing devices 10(1)-10(3) and/or one or more of the cloud computing server devices 42(1)-42(n) in the cloud computing environment 40 may also train a neural network 39 on a subset of data with detected delays corresponding to a multipath condition and another subset of data with detected delays not corresponding to a multipath condition to more accurately identify a multipath condition.

If in step 308, the user equipment computing device 10(1) determines there is no spoofing from a simulated signal, then the GNSS time is correct and the No branch can be taken back to step 300 to re-initialize the internal UTC time to get it back into synchronization. If in step 308, the user equipment computing device 10(1) determines there is spoofing from a simulated signal, then the Yes branch is taken to step 314 where an alarm of a spoofing attack is provided to the user equipment computing device 10(1), although the alarm could be provided to other devices and/or other types of alerts may be provided.

If back in step 310, the user equipment computing device 10(1) determines the GNSS time is delayed from the internal UTC synchronized time, then the Yes branch is taken to step 312. In step 312, the user equipment computing device 10(1) determines if the delay is the result of a multipath condition.

Detection of a time delay indicating a replay attacked can be complicated by a multipath condition. GNSS radio signals from the GNSS satellites 12(1)-12(n) take both a direct path to the GNSS receiver 28 of the user equipment computing device 10(1) and a bounce path, reflecting off of nearby objects or the ground, for example. These signals are typically weaker and can be usually rejected by other means, but there are certain circumstances where they can be strong enough to corrupt the reception. The bounced paths are always longer than the direct path so reception of a multipath signal may mimic a fake replay attack signal.

The multipath signal can be differentiated from one of the fake signals (F1-Fn) by the user equipment computing device 10(1) by comparing the delay times reported by each of multiple ones of the GNSS satellites 12(1)-12(n). For the one of the fake signals (F1-Fn) from a replay attack, the added delay for all GNSS satellite signals will be identical, however for a multipath condition the user equipment computing device 10(1) will detect a variation from one of the GNSS satellites 12(1)-12(n) to another one of the GNSS satellites 12(1)-12(n) because the angle of arrivals will all be different, creating unique multipaths for each of the GNSS satellites 12(1)-12(n). The same approach can be used by the user equipment computing devices 10(1)-10(3) and/or the cloud computing server devices 42(1)-42(n) in the cloud computing environment 40 in the example in FIG. 4.

Accordingly, if in step 312 the user equipment computing device 10(1) determines the delay is the result of a multipath condition, then the Yes branch taken back to step 304 to continue with normal operations. However, if in step 312 the user equipment computing device 10(1) determines the delay is not the result of a multipath condition, then the No branch is taken to step 314 where an alarm of a spoofing attack is provided to the user equipment computing device 10(1), although the alarm could be provided to other devices and/or other types of alerts may be provided.

In examples of this technology as illustrated in FIG. 4, the user equipment computing device 10(2) may receive direction of signal arrival data by a directional antenna 30(2) of the GNSS receiver 28. The user equipment computing device 10(2) may determine an estimated location of a source of the fake GNSS signal based on the direction of the signal arrival data when the identification indicates the alert condition for the replay attack. The user equipment computing device 10(2) may provide the estimated location of the source of the replay attack, such as the location of the attacker equipment computing device 14.

In other examples, an attacker equipment computing device 14 may intentionally insert delay so the perceived difference between a valid time and a replay attack time aligns with an integer second, minute, hour or day boundary. This makes the replay attack less noticeable, especially during leap second step changes that occur on occasional June 30 or December 31 boundaries. The detection algorithm in the user equipment computing device 10(1) may be further configured to take into account these cases and detect jumps not only in the fractional second reported values, but also the integer second and time of week reported values. In further examples, the replay detection method is also valid for applications where the user equipment computing device 10(1) is fixed, not mobile, such as applications where GNSS reception is being used for determining precise time.

Accordingly, as illustrated and described by way of the examples herein this technology provides methods and devices that effectively detect replay attacks in GNSS systems. Examples of this technology may also eliminate false positives by identifying detected delays related to a multipath condition. Examples of this technology also may utilize neural network detector or other artificial intelligence to identify delays between a UTC and a GNSS time to effectively detect a replay attack and to efficiently identify any multipath condition. Additionally, examples of this technology which utilize a directional antenna may generate and provide an estimated location of attacking computing equipment. Further, examples of this technology may execute various aspects of this technology in a cloud computing environment which can be communicated to user equipment devices.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for countering and detecting a replay attack, the method comprising:
    monitoring, by a computing device, a Global Navigation Satellite System (GNSS) time obtained by a GNSS receiver from a GNSS signal from a GNSS satellite;
    identifying, by the computing device, an alert condition for the replay attack based on at least a detected delay between a universal coordinated time (UTC) and the GNSS time, wherein the identifying the alert condition for the replay attack further comprises:
        dynamically adjusting, by the computing device, a threshold based on an analysis of data of any identified alert conditions;
        determining, by the computing device, when the detected delay between the UTC and the GNSS time is above the dynamically adjusted threshold; and
    providing, by the computing device, an alert notification based on the identification of the alert condition for the replay attack.

2. The method as set forth in claim 1 further comprising:
    obtaining, by the computing device, the UTC time initially from another GNSS signal received by the GNSS receiver; and
    maintaining, by the computing device, the obtained UTC time with a control clock device and a disciplined oscillator.

3. The method as set forth in claim 1 further comprising:
    obtaining, by the computing device, the UTC time initially from a time source; and
    maintaining, by the computing device, the obtained UTC time with a control clock device and a disciplined oscillator.

4. The method as set forth in claim 1 further comprising:
    obtaining, by the computing device, the UTC time from two or more disciplined oscillators, wherein each of the disciplined oscillators has been disciplined from the GNSS signal individually and at a different time from each other.

5. The method as set forth in claim 1 wherein the dynamically adjusting the threshold is further based on an analysis of data of any identified alert conditions received by one or more other computing devices located within a set geographic region.

6. The method as set forth in claim 1 wherein the identifying the alert condition for the replay attack further comprises:

determining, by the computing device, when the detected delay between the UTC and the GNSS time indicates a multipath condition; and identifying, by the computing device, the alert condition for the replay attack when the determination indicates the detected delay fails to indicate a multipath condition.

7. The method as set forth in claim 6 wherein the determining when the detected delay between the UTC and the GNSS time indicates the multipath condition is based on a neural network detector trained by a machine learning technique on a subset of data on detected delays which indicated the multipath condition and another subset of data on detected delays which failed to indicate the multipath condition.

8. The method as set forth in claim 1 further comprising:
receiving, by the computing device, direction of signal arrival data by a directional antenna of the GNSS receiver;
determining, by the computing device, an estimated location of a source of the GNSS signal when the identification indicates the alert condition for the replay attack;
providing, by the computing device, the estimated location of the source of the replay attack.

9. A non-transitory machine-readable medium having stored thereon instructions comprising executable code which when executed by one or more processors, causes the processors to:
monitor a Global Navigation Satellite System (GNSS) time obtained by a GNSS receiver from a GNSS signal from a GNSS satellite;
identify an alert condition for the replay attack based on at least a detected delay between a universal coordinated time (UTC) and the GNSS time, wherein the identify the alert condition for the replay attack further comprises:
dynamically adjusts a threshold based on an analysis of data of any identified alert conditions;
determine when the detected delay between the UTC and the GNSS time is above the dynamically adjusted threshold; and
provide an alert notification based on the identification of the alert condition for the replay attack.

10. The medium as set forth in claim 9 wherein the instructions further comprise executable code which when executed by one or more processors, causes the processors to:
obtain the UTC time initially from another GNSS signal received by the GNSS receiver; and
maintain the obtained UTC time with a control clock device and a disciplined oscillator.

11. The medium as set forth in claim 9 wherein the instructions further comprise executable code which when executed by one or more processors, causes the processors to:
obtain the UTC time initially from a time source; and
maintain the obtained UTC time with a control clock device and a disciplined oscillator.

12. The medium as set forth in claim 9 wherein the instructions further comprise executable code which when executed by one or more processors, causes the processors to:
obtain the UTC time from two or more disciplined oscillators, wherein each of the disciplined oscillators has been disciplined from the GNSS signal individually and at a different time from each other.

13. The medium as set forth in claim 9 wherein the instructions for the dynamically adjusts a threshold, further comprise executable code which when executed by one or more processors, causes the processors to:
dynamically adjust the threshold based on an analysis of data of any identified alert conditions received by one or more other computing devices located within a set geographic region.

14. The medium as set forth in claim 9 wherein the instructions for the identify the alert condition for the replay attack further comprise executable code which when executed by one or more processors, causes the processors to:
determine when the detected delay between the UTC and the GNSS time indicates a multipath condition; and
identify the alert condition for the replay attack when the determination indicates the detected delay fails to indicate a multipath condition.

15. The medium as set forth in claim 14 wherein the determine when the detected delay between the UTC and the GNSS time indicates the multipath condition is based on a neural network detector trained by a machine learning technique on a subset of data on detected delays which indicated the multipath condition and another subset of data on detected delays which failed to indicate the multipath condition.

16. The medium as set forth in claim 9 wherein the instructions further comprise executable code which when executed by one or more processors, causes the processors to:
receive direction of signal arrival data by a directional antenna of the GNSS receiver;
determine an estimated location of a source of the GNSS signal when the identification indicates the alert condition for the replay attack;
provide the estimated location of the source of the replay attack.

17. A computing device comprising:
a memory comprising programmed instructions stored thereon and one or more processors configured to be capable of executing the stored programmed instructions to:
monitor a Global Navigation Satellite System (GNSS) time obtained by a GNSS receiver from a GNSS signal from a GNSS satellite;
identify an alert condition for the replay attack based on at least a detected delay between a universal coordinated time (UTC) and the GNSS time, wherein the identify the alert condition for the replay attack further comprises:
dynamically adjusts a threshold based on an analysis of data of any identified alert conditions;
determine when the detected delay between the UTC and the GNSS time is above the dynamically adjusted threshold; and
provide an alert notification based on the identification of the alert condition for the replay attack.

18. The device as set forth in claim 17 wherein the processors are further configured to be capable of executing the stored programmed instructions to:
obtain the UTC time initially from another GNSS signal received by the GNSS receiver; and
maintain the obtained UTC time with a control clock device and a disciplined oscillator.

19. The device as set forth in claim 17 wherein the processors are further configured to be capable of executing the stored programmed instructions to:

obtain the UTC time initially from a time source; and
maintain the obtained UTC time with a control clock device and a disciplined oscillator.

20. The device as set forth in claim 17 wherein the processors are further configured to be capable of executing the stored programmed instructions to:
obtain the UTC time from two or more disciplined oscillators, wherein each of the disciplined oscillators has been disciplined from the GNSS signal individually and at a different time from each other.

21. The device as set forth in claim 17 wherein for the dynamically adjusts the threshold, the processors are further configured to be capable of executing the stored programmed instructions to:
dynamically adjust the threshold based on an analysis of data of any identified alert conditions received by one or more other computing devices located within a set geographic region.

22. The device as set forth in claim 17 wherein for the identify the alert condition for the replay attack the processors are further configured to be capable of executing the stored programmed instructions to:
determine when the detected delay between the UTC and the GNSS time indicates a multipath condition; and
identify the alert condition for the replay attack when the determination indicates the detected delay fails to indicate a multipath condition.

23. The device as set forth in claim 22 wherein the determine when the detected delay between the UTC and the GNSS time indicates the multipath condition is based on a neural network detector trained by a machine learning technique on a subset of data on detected delays which indicated the multipath condition and another subset of data on detected delays which failed to indicate the multipath condition.

24. The device as set forth in claim 17 wherein the processors are further configured to be capable of executing the stored programmed instructions to:
receive direction of signal arrival data by a directional antenna of the GNSS receiver;
determine an estimated location of a source of the GNSS signal when the identification indicates the alert condition for the replay attack;
provide the estimated location of the source of the replay attack.

25. A system comprising one or more server devices executing in a cloud environment or one or more computing devices, each of the devices having memory comprising programmed instructions stored thereon and one or more processors configured to execute one or more of the stored programmed instructions to:
monitor a Global Navigation Satellite System (GNSS) time obtained by a GNSS receiver from a GNSS signal from a GNSS satellite;
identify an alert condition for the replay attack based on at least a detected delay between a universal coordinated time (UTC) and the GNSS time, wherein the identify the alert condition for the replay attack further comprises:
dynamically adjusts a threshold based on an analysis of data of any identified alert conditions;
determine when the detected delay between the UTC and the GNSS time is above the dynamically adjusted threshold; and
provide an alert notification based on the identification of the alert condition for the replay attack.

26. The system as set forth in claim 25 wherein the processors are further configured to be capable of executing the stored programmed instructions to:
obtain the UTC time initially from another GNSS signal received by the GNSS receiver; and
maintain the obtained UTC time with a control clock device and a disciplined oscillator.

27. The system as set forth in claim 25 wherein the processors are further configured to be capable of executing the stored programmed instructions to:
obtain the UTC time initially from a time source; and
maintain the obtained UTC time with a control clock device and a disciplined oscillator.

28. The system as set forth in claim 25 wherein the processors are further configured to be capable of executing the stored programmed instructions to:
obtain the UTC time from two or more disciplined oscillators, wherein each of the disciplined oscillators has been disciplined from the GNSS signal individually and at a different time from each other.

29. The system as set forth in claim 25 wherein for the dynamically adjusts the threshold, the processors are further configured to be capable of executing the stored programmed instructions to:
dynamically adjust the threshold based on an analysis of data of any identified alert conditions received by one or more other computing devices located within a set geographic region.

30. The system as set forth in claim 25 wherein for the identify the alert condition for the replay attack the processors are further configured to be capable of executing the stored programmed instructions to:
determine when the detected delay between the UTC and the GNSS time indicates a multipath condition; and
identify the alert condition for the replay attack when the determination indicates the detected delay fails to indicate a multipath condition.

31. The system as set forth in claim 30 wherein the determine when the detected delay between the UTC and the GNSS time indicates the multipath condition is based on a neural network detector trained by a machine learning technique on a subset of data on detected delays which indicated the multipath condition and another subset of data on detected delays which failed to indicate the multipath condition.

32. The system as set forth in claim 25 wherein the processors are further configured to be capable of executing the stored programmed instructions to:
receive direction of signal arrival data by a directional antenna of the GNSS receiver;
determine an estimated location of a source of the GNSS signal when the identification indicates the alert condition for the replay attack;
provide the estimated location of the source of the replay attack.

* * * * *